UNITED STATES PATENT OFFICE.

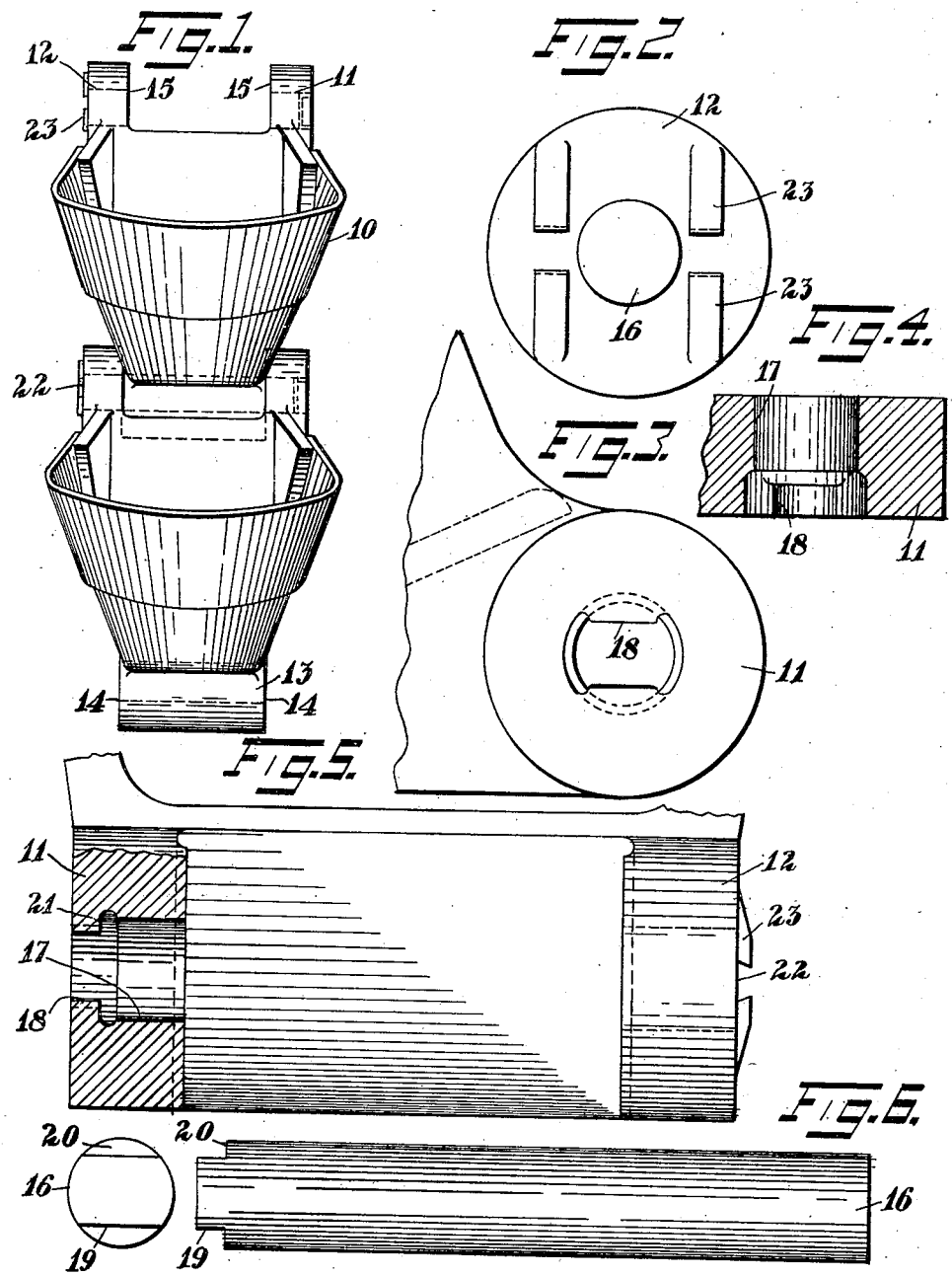

EDWIN J. BEVAN, OF HIGH BRIDGE, NEW JERSEY.

DREDGE.

No. 886,343.　　　Specification of Letters Patent.　　　Patented May 5, 1908.

Application filed February 24, 1908. Serial No. 417,576.

*To all whom it may concern:*

Be it known that I, EDWIN J. BEVAN, a citizen of the United States, residing in High Bridge, in the county of Hunterdon and State of New Jersey, have invented certain new and useful Improvements in Dredges, of which the following is a specification.

This invention relates to dredges, and has for an object to provide an improved construction of pin for pivoting dredge buckets together, and improved means for holding the pin in position against rotation.

One of the important features to be taken into consideration in the pivot pins employed for connecting dredge buckets together into a chain is that a pin when held from rotation will wear off on one side, and when it is desired to renew the bearing surface of the pin this will be turned through a half rotation, or 180 degrees, which will then present a fresh and unworn bearing surface. One end of the dredge bucket will be provided with a pair of extensions or lugs between which an extension or lug from the other end of a similar bucket will be received, and through said pair of lugs a pin seat will be provided registering with a bearing, in the intermediate lug, for the pin.

In my improved construction the bearing for the pin, the pin, and the pin seat are cylindrical in form. The pin will be flattened at one end, and one of the pair of lugs will carry, adjacent to its cylindrical pin seat, flattened faces for engaging the flattened faces upon the pin and preventing its rotation relative to said lug. The faces for preventing the rotation of the pin are located at a considerable distance from the point where there will be a shearing strain placed upon the end of the pin.

In the drawings accompanying and forming a part of this specification Figure 1 illustrates in top plan view a section of a chain of dredge buckets embodying my present improvement. Fig. 2 is an enlarged end view of one of the bucket ends or lugs, illustrating a convenient means for holding a key for preventing longitudinal movement of the pin. Fig. 3 illustrates the lug at the opposite side of the bucket. Fig. 4 is a longitudinal section of the lug illustrated in Fig. 3. Fig. 5 is a view taken transversely of the Figs. 2 and 3, showing both lugs at one end of the bucket. The lug having more to do with my present improvement is shown in vertical section in this view. Fig. 6 is a detail of the pin; and Fig. 7 is a detail of a key for preventing the removal of the pin.

In practice, dredge buckets, two of which are illustrated in Fig. 1, and are designated without preference by the reference character 10, are linked together in a continuous chain. A forward portion of each bucket will be provided at its respective sides with lugs, designated by the reference characters 11 and 12 respectively, between which lugs will be received a lug or bearing member 13 at the rear portion of the adjacent bucket. The end faces 14 of which lug 13 will engage the inner faces 15 of the lugs 11 and 12. A cylindrical hole affording a pin seat and bearing for a pin 16 will be made through the lugs 11, 12 and 13, which hole will be transverse to the general direction of chain movement, and consequently transversely of the strain or drag. The cylindrical pin seat in the lug 11 is designated by the reference character 17. In the illustrated construction the pin will be held rigid with the lugs 11 and 12, and the lug 13 will oscillate upon the pin. At the outer end of the pin seat 17 will be provided faces 18, which are shown as flat for engaging faces 19, which are shown as flat, upon the pin 16. The shearing force or strain to which the pin will be subjected will be exerted upon it between the faces 14 and 15, and it will be seen that the flattened portion 19 of the pin is located at a considerable distance from the point at which such shearing faces act on the end of the pin.

Preferably the faces 18 are located in planes parallel with the path of movement of the chain of dredge buckets, and consequently parallel with the direction of strain, and if there is any unequalness in fit the engagement between the faces 18 and 19 will not have a tendency to force the pin from properly seating upon the seat 17, or from improperly engaging the bearing in the lug 13.

In assembling the parts the pin 16 will be passed through the lugs 12, 13 and 11, the faces 19 will be caused to engage the faces 18 which will prevent the rotation of the pin relative to the lugs 11 and 12, and the shoulder 20 of the pin will be caused to abut the shoulder 21 formed upon the inner side of the members which carry the faces 18. The pin will be held in this position by driving a suitably formed wedge or key 22 between the wedge holding members 23. This key feature in its detailed construction forms no part of the present invention, and consequently will not be described in greater detail.

Experience has demonstrated that the pins wear off on the side which is toward the direction of movement of the chain of buckets, and the present improvement permits the ready removal of the pin and its rotation through 180 degrees, and its reinsertion. It may readily be removed by knocking out the key 22 when a sufficient blow will loosen the pin, after which it may be turned and replaced with a new bearing surface directed toward the position of wear. It will be seen that the present pin can only be inserted in two positions, it may be turned through a half rotation, and this is the only amount of turning, except a complete rotation, which it is capable of.

It is a well known fact that a part which has a reduced portion such reduced portion ending in a square shoulder when strain is applied to the reduced portion fractures are liable to occur adjacent to the shoulder. If a pin for dredge buckets is provided with a flattened or a squared end reducing the cross sectional area of the pin which is provided with a shoulder at the commencement of such reduced portion and this reduced portion is the only part of the pin which is in the pin seat there will be a great tendency for the pin to fracture at the point above referred to. In my improved construction the portion of the pin which is flattened is located in such a position that the strain will come upon the unreduced part of the end of the pin rather than upon the part which is reduced for engaging faces for preventing the turning of the pin in its seat. This construction it will readily be seen is of a durable nature.

Having described my invention I claim:

1. A dredge bucket having at one end a pair of spaced apart lugs provided with a cylindrical pin seat, one of said lugs carrying adjacent to the outer end of its pin seat flattened faces, and a pin mounted in said seat and having flattened faces coöperative with said flattened faces upon the lug for preventing rotation of the pin relative to its seat.

2. A dredge bucket having at one end a lug provided with a transverse cylindrical bearing and at its other end a pair of lugs spaced apart for receiving a lug similar to said former lug upon another bucket and provided with cylindrical pin seats for registering with the bearing in said received lug, one of said lugs being provided with members projecting into the outer end of the pin seat and having flattened faces, and a pin in said seats and bearing and having flattened faces at its end for engaging the flattened faces on said members.

3. The combination with a chain of dredge buckets, each of said buckets having at one end a lug provided with a bearing and at its opposite end a pair of lugs provided with pin seats registering with the bearing upon the lug of an adjacent bucket, and one of said pair of lugs being provided with a pair of flattened faces parallel with the line of the chain, and a pin seated in each of said pair of lugs and the bearing of the adjacent lug and provided with flat faces for engaging the faces upon said lug.

Signed at Nos. 9–15 Murray street, New York, N. Y., this 21" day of February, 1908.

EDWIN J. BEVAN.

Witnesses:
FRED. J. DOLE,
GUSTAV DREWS.